United States Patent
Chin

(10) Patent No.: US 8,848,784 B2
(45) Date of Patent: Sep. 30, 2014

(54) VIDEO BIT-RATE CONTROL

(75) Inventor: Richard Chin, Southampton (GB)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 477 days.

(21) Appl. No.: 13/226,755

(22) Filed: Sep. 7, 2011

(65) Prior Publication Data
US 2012/0063510 A1    Mar. 15, 2012

(30) Foreign Application Priority Data

Sep. 9, 2010 (EP) .................................... 10175907

(51) Int. Cl.
| | |
|---|---|
| H04N 7/26 | (2006.01) |
| H04N 21/2385 | (2011.01) |
| H04N 21/6587 | (2011.01) |
| H04N 21/2365 | (2011.01) |
| H04N 21/24 | (2011.01) |
| H04N 21/475 | (2011.01) |

(52) U.S. Cl.
CPC ....... H04N 21/2402 (2013.01); H04N 21/2385 (2013.01); H04N 21/6587 (2013.01); H04N 21/2365 (2013.01); H04N 21/4755 (2013.01)
USPC .................................................. 375/240.02

(58) Field of Classification Search
None
See application file for complete search history.

(56) References Cited

U.S. PATENT DOCUMENTS

| | | | |
|---|---|---|---|
| 2007/0153916 A1 | 7/2007 | Demircin et al. | |
| 2008/0279388 A1* | 11/2008 | Oh et al. ........................ | 381/1 |
| 2008/0310454 A1 | 12/2008 | Bellwood et al. | |
| 2009/0012821 A1 | 1/2009 | Besson et al. | |

FOREIGN PATENT DOCUMENTS

| | | |
|---|---|---|
| EP | 0901301 | 3/1999 |
| EP | 1045555 | 10/2000 |

OTHER PUBLICATIONS

European Search Report for 10175907.4 dated Apr. 5, 2011.

* cited by examiner

Primary Examiner — Sath V Perungavoor
Assistant Examiner — Kate Luo
(74) Attorney, Agent, or Firm — Baker Botts L.L.P.

(57) ABSTRACT

This document relates to video transport systems and in particular, though not exclusively, where several compressed or encoded video services are multiplexed into a fixed bit rate transmission stream. There is provided a method of allocating bit-rates for video services in a transport channel. The method comprises receiving user defined weighting parameters for a number of video services (410); then determining an available bit-rate for a transport channel for the video services (420). The method then automatically allocates a proportion of the available bit-rate to each video service according to their respective weighting parameters (430); and multiplexes the video services into the transport channel according to the allocated proportions of the available bit-rate (440).

12 Claims, 4 Drawing Sheets

VIDEO BIT-RATE CONTROL

This application claims priority to EP 10175907.4 filed 9 Sep. 2010, the entire contents of each of which are hereby incorporated by reference.

TECHNICAL FIELD

This document relates to video transport systems and in particular, though not exclusively, where several compressed or encoded video services are multiplexed into a fixed bit rate transmission stream.

BACKGROUND

Video compression systems that implement standards such as MPEG2 or MPEG4/H264 are usually designed to reduce the bit rate of the input video to levels that permit affordable transmission of high quality pictures. It is usual that several video services are multiplexed into a fixed bit rate Transport Stream [TS] that will occupy convenient channels of known transmission systems. Various complex control mechanisms exist for controlling the bit rate of the video services, based in part of their content, and are typically used for direct broadcasting of video services to the home. In some situations, video services are combined and transmitted for the purposes of returning original material to a central studio or processing centre, for example for Digital Satellite News Gathering [DSNG] or so-called "Contribution" or "Back Haul". In these situations the usual complex method of controlling the total bit rate for home distribution is not appropriate. Typically the number of channels is limited, for example 4 or 5, and the bit rates for each video service are set manually by an experienced on-site operator.

SUMMARY

The inventors have appreciated a problem of under underutilization of the transport stream when manually setting bit-rates for each video services to be multiplexed into the transport stream. For example the user set bit-rates may not sum to the available bit-rate of the transport stream resulting in NULL bytes which represent a waste of bandwidth. Furthermore, by not using the full bit-rate available, the video services are of a lower quality than they could be. In addition, when a video service is dropped, the level of NULL bytes will increase.

There is provided a method of allocating bit-rates for video services in a transport stream or channel. The method receives user defined weighting parameters for the video services and determines an available bit-rate for the transport channel for these video services. The method then automatically allocates a proportion of the available bit-rate to each video service according to their respective weighting parameters. The video services are then multiplexed into the transport channel according to the allocated proportions of the available bit-rate.

By automatically allocating bit-rates based on user defined weighting parameters, the method optimises the use of the transport channel or stream by allocating all or substantially all of the available bit-rate. Therefore video service quality is optimised or maximised, and the number of NULL bytes in the transport channel is minimised.

The method can also adapt to changes in the number of video services multiplexed into the transport channel. The method can be used in combination with a compression or encoding system and adapt to constraints associated with that system. For example, when used in combination with an MPEG2 or MPEG4 encoding system, the method can automatically distribute excess bit-rate from one video service which has exceeded it's maximum bit-rate Bmax to the other video services according to their respective weighting parameters.

There is also provided a video service multiplexing system and a computer program product comprising code which when executed on a computer carries out the above described methods.

BRIEF DESCRIPTION OF THE DRAWINGS

Embodiments are described with reference to the attached drawings, by way of example only and without intending to be limiting, in which.

DETAILED DESCRIPTION

Figure 1:
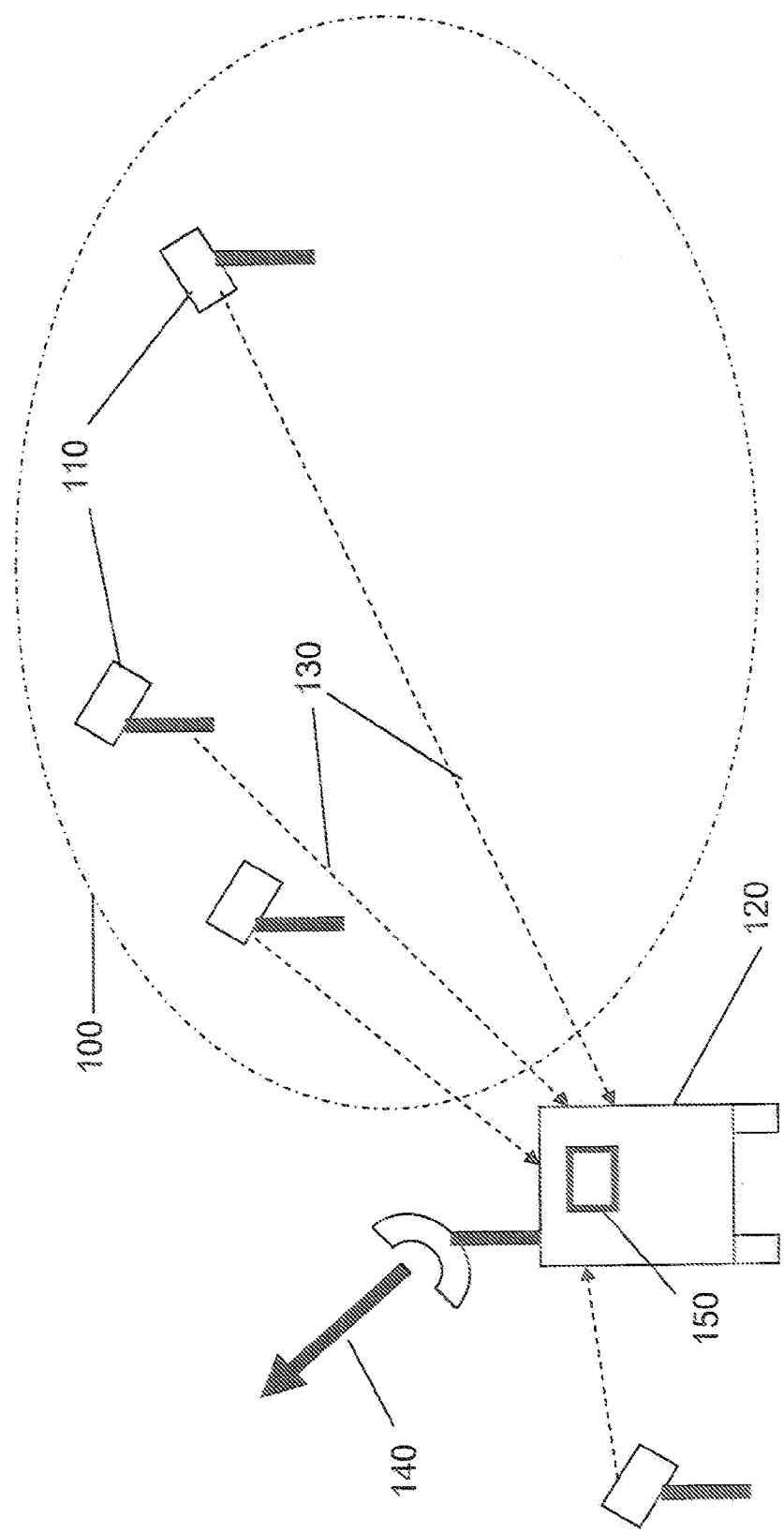
FIG. 1 is a diagram illustrating an application of an embodiment.

Referring to FIG. 1, an application of an embodiment is illustrated in which a sporting event is being recorded and transmitted to a central processing site (not shown) for subsequent broadcast to viewers. The sports arena is indicated by reference 100, and the action is being recorded by a number of video cameras 110. This may include footage of players engaged in a football match together with talking head footage of expert commentary for example. A mobile truck 120 includes a video service multiplexing system 150 according to an embodiment. A number of video services 130 are feed to the system 150, which may encode or compress them. The video services are then multiplexed to generate a transport stream or channel 140 which is transmitted back to the central processing site.

Figure 2:
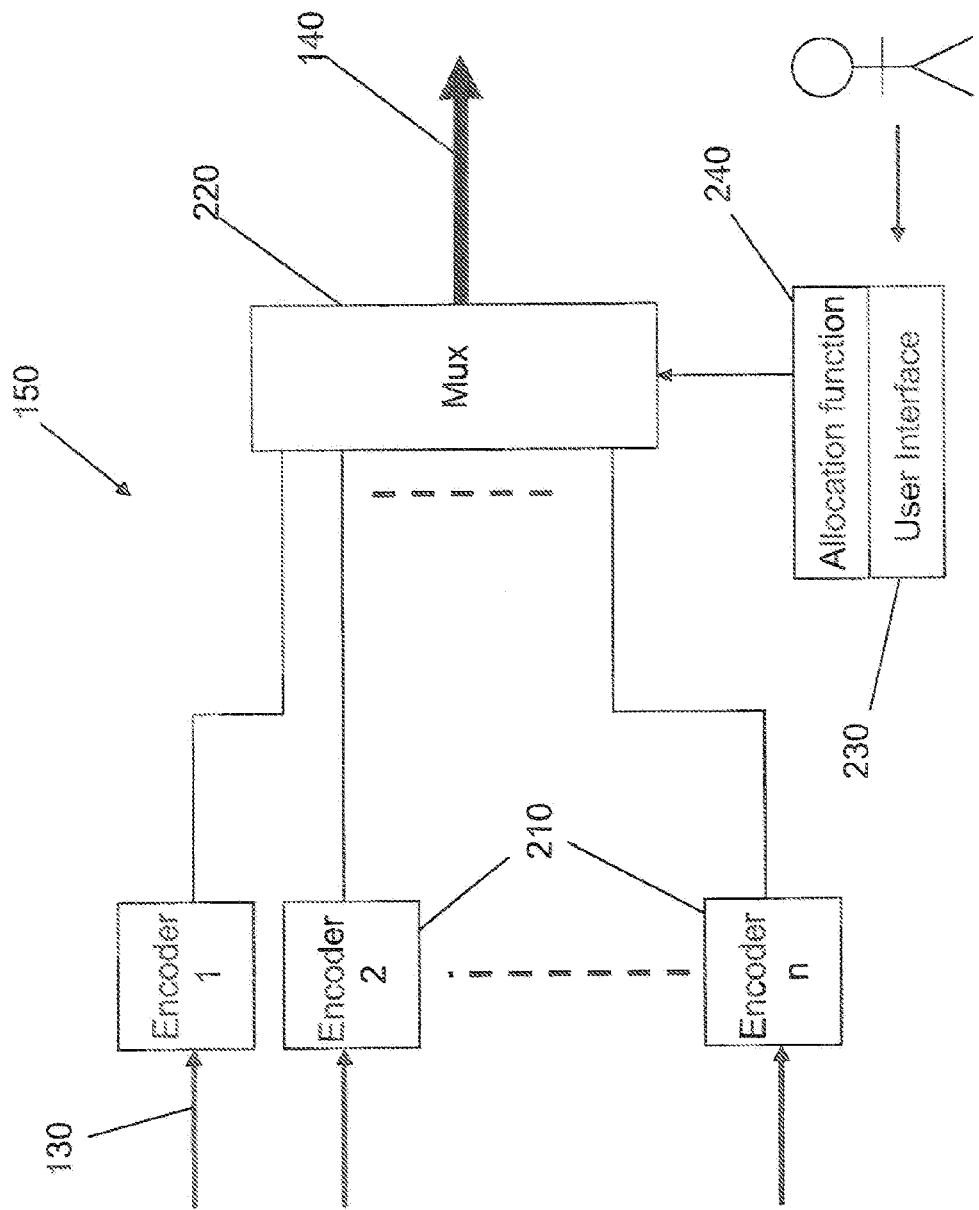
FIG. 2 is a block schematic of the technical features of an embodiment.

A block schematic of the video multiplexing system 150 is shown in FIG. 2. This system 150 comprises a number of encoders 210 corresponding to the received video services 130, a multiplexer 220, a user interface 230, and an allocation function 240. The encoders 210 may compress the video services 130 according to MPEG2, MPEG4 or another video compression system. The compressed video services are then fed to the multiplexer 220 which multiplexes the video services according to respective bit-rate control settings provided by the allocation function 240. Thus for example a high definition video service may be set at a bit-rate of 20 Mbs, whilst a standard definition video service may be set at a bit-rate of 10 Mbs. The multiplexed video services are then output from the system as a transport channel 140 for example as a transport stream defined by MPEG2 Part 1.

The allocation function 240 is typically implemented by a processor running an algorithm which interacts with the user interface 230. The user interface 230 receives user defined weighting parameters for the video services. These weighting parameters for each channel (130) are passed to the allocation function 240 which also determines an available bit-rate for the transport channel 140. The total bit-rate of the transport stream 140 is typically fixed by a user setting and the bandwidth of the transport system. Some of this total bit-rate will be used for overhead and audio data, leaving an available bit-rate for video services. The overheads and audio bit-rate are removed from the total bit-rate to leave an available bit-rate. The removed bit-rate includes all audio, Vertical Blanking interval [VBI] data, Programme Specific Information [PSI] data and video service Bmins [a parameter set by the MPEG specifications]. Typically the bit-rate provided for audio data and other overhead is allocated by a user; the remaining bit-rate being used by the system to allocate automatically to the video services. In an alternative arrangement, the audio and/or overhead bit-rate may be dynamically variable, in which case the system adapts the available bit-rate for video services accordingly.

Figure 3:
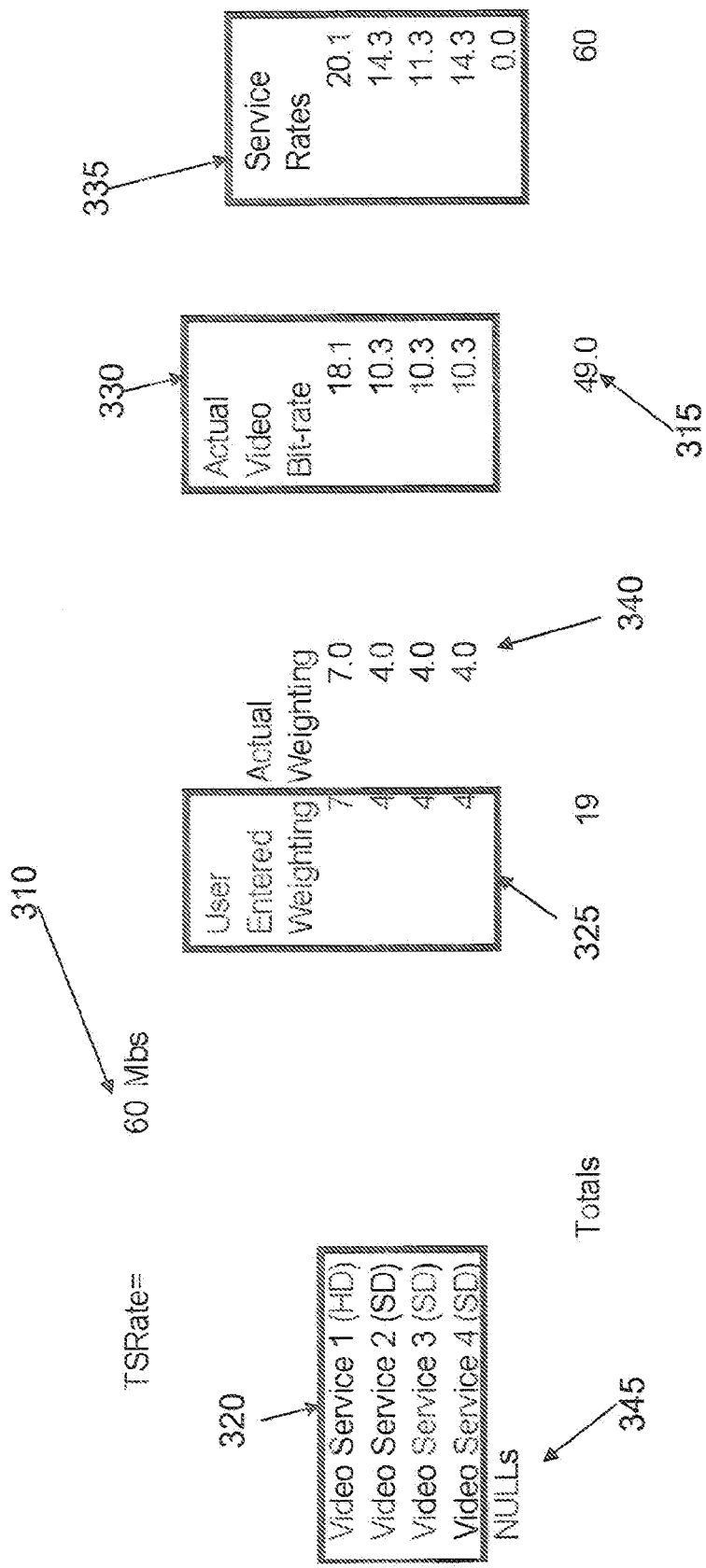
FIG. 3 is a user interface of an embodiment.

FIG. 3 shows an input screen for the user interface 230 which may be implemented using a display device and appropriate software as would be appreciated by those skilled in the art. The screen shows the total bit-rate for the transport channel 310, the available bit-rate for the video services 315, and the various video services 320. User entered weighting parameters for each video service are shown at 325, and the proportion of the available bit-rate allocated to each video service is shown at 330. An example allocation calculation for video service 1 follows:

Available bit-rate=49.0
Service 1 weighting parameter=7
Total weighting parameters=19
Service 1 bit-rate=7/19×49.0=18.1 Mbs Similar calculations are performed for the other video services in order to allocate a proportion of the available bit-rate.

The service rate of each video service is shown at 335, and this includes video, audio and overhead bits for each video service 320. Actual weightings for each video service are also shown at 340. In some situations these may not correspond exactly with the user entered weighting parameters at 325 due to system constraints. For example where the allocated bit-rate of a video service would be below the minimum defined by the MPEG2 standard, then the allocation function allocates at least this minimum bit-rate to the video service, and re-allocates the remaining available bit-rate to the other video services according to their respective weighting parameters.

The packet NULLS shown at 345 are also minimised by the system as can be seen (Service Rate=0.0). These NULL packets are transport stream packets with no video data and their presence effectively reduces the available bandwidth of the transport stream to carry the video services. If the bit-rates of the video services were incorrectly set manually, such that not all of the available bit-rate was utilized by the video services, then NULLS would be used to fill the transport stream.

Once the bit-rates 330 are allocated to each video service, these are used to control the respective encoders 210 to fix the bit-rate of each video service received by the multiplexer 220. The video services are then multiplexed into the transport stream 140 at their fixed bit-rate allocations, together with their audio and other overhead components, in order to generate the full transport stream bit-rate. The exact multiplexing architecture and operation would be understood by those skilled in the art, for example as described in MPEG Part 1.

In practice, this embodiment can be used to allocate video bit rate on DSNG and Contribution encoders in a simple way that gives the user flexibility in how it is allocated but makes it difficult not to make efficient use of the available bandwidth. In the field the operators of equipment can be less skilled in their operation and so a relatively foolproof interface is provided. The bit rate allocation, once set, can remain at a static value. However it is also possible for the system to adapt to changing parameters such as a change in the total or available bit-rate, or a change in the number of video services. The system can also allow for the manual fixing of a bit-rate for one or more of the video services, then automatically allocating the remaining bit-rates for the other video services using the user defined weighting parameters.

Figure 4:
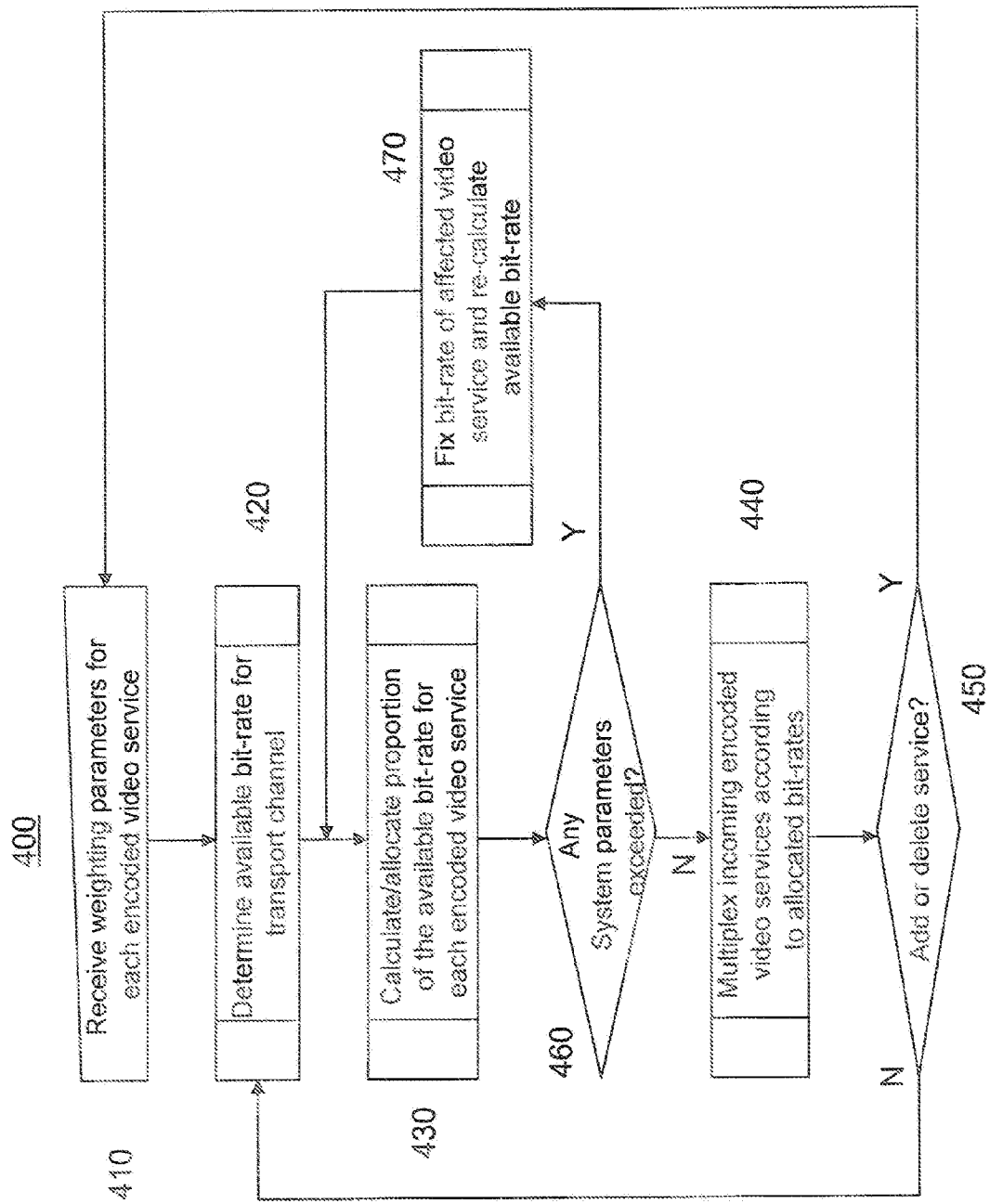
FIG. 4 is a flow-chart of a method according to an embodiment.

A method according to the embodiment is shown in FIG. 4. This method may be implemented for example by the system of FIG. 2 and the user interface of FIG. 3. At step 410, the method receives weighting parameters for each encoded video service. As discussed above, this may be achieved using a display screen based user interface in which the user directly enters weighting parameters for each video service. In alternative embodiments, the user may enter fixed bit-rates for one or some of the video services, and weighting parameters for others. In this case, the fixed bit-rates will be subtracted from the available bit-rate and the remaining video service bit-rates allocated from the remaining available bit-rate according to their respective weighting parameters. In a further embodiment, fixed bit-rates are entered by the user, and the method then calculates weighting parameters for each video service based on the entered bit-rates.

The method then determines the available bit-rate for the video services at step 420, and as already described above. Once initially determined, the available bit-rate may be stored locally until it changes. Then at step 430, the method allocates a proportion of the available bit-rate to each video service according to their respective weighting parameters. These allocated bit-rates may also depend on other factors such as meeting a minimum or maximum bit-rate according to system limitations. Therefore at step 460 the method checks whether an system parameters have been exceeded by any of the video services. In an MPEG based system, the proportion of available bit-rate allocated to each video service is checked to determine whether these fall within Bmin and Bmax. If there is no violation of system parameters, the method moves to the multiplexing step 440. However if there are system parameters exceeded on any of the video services, then at step 470 the method corrects the bit-rate allocation of the affected video service by either increasing or decreasing its bit-rate allocation to meet the system parameters. The available bit-rate is then re-determined by subtracting the bit-rate allocated to the affected video service from the available bit-rate. The method then returns to step 430 where the re-determined available bit-rate is re-allocated to the remaining non-affected video services according to their respective weighting parameters.

For example if the weighting parameter for video service x would result in a bit-rate below a minimum predetermined bit-rate Bmin, then the method ensures that at least Bmin is allocated to video service x, and the remaining available bit-rate is then allocated to the other video services according to their respective weighting parameters. Similarly, if a maximum predetermined bit-rate Bmax would be exceeded due to the weighting parameter allocated to video service x, then the method allocates Bmax to video service x, subtracts this Bmax from the available bit-rate and allocates this remaining bit-rate to the other video services according to their respective weighting parameters. Where possible, all of the available bit-rate is allocated to the video services in order to reduce the number of NULL packets in the transport stream.

The allocated bit-rates are then used to fix the bit-rates of the respective video services, which are then multiplexed together at step 440 as described previously. At step 450, the method checks for the addition or deletion of video services. If there is no change in the number of video services, then the method may either terminate or re-run from step 420 as shown. If there is a deletion or addition of video services, the method returns to step 410. When a video service is deleted, its weighting parameter can be set to zero so that no bit-rate is allocated to it at step 430. The method then re-allocates the available bit-rate amongst the remaining channels according to their respective weighting parameters. The multiplexing process is then updated at step 440. When a video service is added, the user is requested to enter a weighting parameter, and the proportion of the available bit-rate allocated to each video service is re-allocated according to the relative weighing parameters of all of the video services, including the new one.

Where there are more video services than can be handled by a single multiplex or transport stream, additional systems according to FIG. 2 and/or methods according to FIG. 4 can be implemented in parallel in order to generate additional transport streams where the video services are allocated bit-rates dependent on user defined weighting parameters.

Modifications and other embodiments of the disclosed invention will come to mind to one skilled in the art having the benefit of the teachings presented in the foregoing descriptions and the associated drawings. Therefore, it is to be understood that the invention is not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method of allocating bit-rates for video services in a transport channel, the method comprising:
receiving user defined weighting parameters for a number of video services;
determining an available bit-rate for a transport channel for the video services;
automatically allocating a proportion of the available bit-rate to each video service according to their respective weighting parameters, wherein the proportions allocated to each video service sum to the available bit-rate to minimize a number of wasted NULL bytes in the transport channel;
multiplexing the video services into the transport channel according to the allocated proportions of the available bit-rate.

2. A method according to claim 1, further comprising automatically re-allocating a proportion of the available bit-rate to each video service according to their respective weighting parameters in response to the addition or deletion of an video service.

3. A method according to claim 1, further comprising allocating a fixed bit-rate to a said video service, and automatically re-allocating a proportion of the remaining transport channel bit-rate to the other video services according to their respective weighting parameters.

4. A method according to claim 1, wherein in response to an allocated bit-rate of a said video service exceeding a predetermined maximum bit-rate (Bmax), reallocating the excess bit-rate to the other video services according to their respective weighting parameters.

5. A method according to claim 1, wherein receiving user defined weighting parameters for a number of video services further comprises receiving user input desired bit-rates for each video service and calculating corresponding weighting parameters.

6. A method according to claim 1, wherein the video services are encoded before said allocating and multiplexing steps.

7. A video service multiplexing system comprising:
a user-interface arranged to receive and store user defined weighting parameters for a number of video services;
an allocation function arranged to determine an available bit-rate for a transport channel for the video services;
the allocation function further arranged to automatically allocate a proportion of the available bit-rate to each video service according to their respective weighting parameters, wherein the proportion allocated to each video service sum to the available bit-rate to minimize a number of wasted NULL bytes in the transport channel; and
a multiplexer controlled by the allocation function to multiplex the video services into the transport channel according to the allocated proportions of the available bit-rate.

8. A system according to claim 7, wherein the allocation function is further arranged to automatically re-allocate a proportion of the available bit-rate to each video service according to their respective weighting parameters in response to the addition or deletion of an video service.

9. A system according to claim 7, wherein the allocation function is further arranged to re-determine the available bit-rate for the transport channel for the video services in response to the allocation of a fixed bit-rate to a said video service, and to automatically re-allocate a proportion of the re-determined available bit-rate to the other video services according to their respective weighting parameters.

10. A system according to claim 7, wherein the allocation function is further arranged to re-determine the available bit-rate for the transport channel for the video services in response to an allocated bit-rate of said video service exceeding a predetermined maximum bit-rate (Bmax), the excess bit-rate being reallocated to the available bit-rate, and to automatically reallocate a proportion of the re-determined available bit-rate to the other video services according to their respective weighting parameters.

11. A system according to claim 7, further comprising video encoders coupled to the multiplexer and for receiving the respective video services.

12. A computer program product stored on a non-transitory computer-readable medium, the computer program comprising code which when executed on a computer carries out a method of allocating bit-rates for video services in a transport channel, the method comprising:
receiving user defined weighting parameters for a number of video services;
determining an available bit-rate for a transport channel for the video services;
automatically allocating a proportion of the available bit-rate to each video service according to their respective weighting parameters, wherein the proportion allocated to each video service sum to the available bit-rate to minimize a number of wasted NULL bytes in the transport channel;
multiplexing the video services into the transport channel according to the allocated proportions of the available bit-rate.

* * * * *

UNITED STATES PATENT AND TRADEMARK OFFICE
CERTIFICATE OF CORRECTION

| | | |
|---|---|---|
| PATENT NO. | : 8,848,784 B2 | Page 1 of 1 |
| APPLICATION NO. | : 13/226755 | |
| DATED | : September 30, 2014 | |
| INVENTOR(S) | : Chin | |

It is certified that error appears in the above-identified patent and that said Letters Patent is hereby corrected as shown below:

In the Drawings

In Fig. 1, Sheet 1 of 4, delete "FIG" and insert -- FIG. --, therefor at each occurrence throughout the figures.

In the Specification

In Column 1, Line 2, under Title, insert -- CROSS REFERENCE TO RELATED APPLICATION --.

In Column 2, Line 4, delete "it's" and insert -- its --, therefor.

In Column 2, Line 60, delete "channel (130)" and insert -- channel --, therefor.

In Column 3, Line 2, delete "interval" and insert -- Interval --, therefor.

In Column 3, Line 2, delete "Programme" and insert -- Program --, therefor.

In Column 3, Line 39, delete "NULLS" and insert -- NULLs --, therefor.

In Column 3, Line 46, delete "NULLS" and insert -- NULLs --, therefor.

In Column 4, Line 28, delete "an system" and insert -- a system --, therefor.

In the Claims

In Column 5, Line 45, in Claim 2, delete "an video" and insert -- a video --, therefor.

In Column 6, Line 23, in Claim 8, delete "an video" and insert -- a video --, therefor.

Signed and Sealed this
Twenty-eighth Day of July, 2015

Michelle K. Lee
*Director of the United States Patent and Trademark Office*